(12) United States Patent
King et al.

(10) Patent No.: US 7,761,798 B1
(45) Date of Patent: Jul. 20, 2010

(54) SYSTEM AND METHOD FOR CONTROLLING THE SCREEN DISPLAY APPEARANCE FOR A DATA PROCESSING SYSTEM

(75) Inventors: Nick King, San Jose, CA (US); David Wong, Cupertino, CA (US); Peter Alexander, San Jose, CA (US); Cameron J. Esfahani, San Jose, CA (US); Debbie McDaniel, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 883 days.

(21) Appl. No.: 09/551,303

(22) Filed: Apr. 18, 2000

(51) Int. Cl.
*G06F 3/00* (2006.01)
(52) U.S. Cl. .................. 715/744; 715/765; 715/789
(58) Field of Classification Search ............. 345/744, 345/745, 746, 747, 765, 864, 866, 905; 715/744, 715/745, 747, 764, 765, 781, 789, 809, 811, 715/866
See application file for complete search history.

(56) References Cited

U.S. PATENT DOCUMENTS

| | | | | |
|---|---|---|---|---|
| 5,734,852 A | * | 3/1998 | Zias et al. | 345/744 |
| 6,091,411 A | * | 7/2000 | Straub et al. | 345/703 |
| 6,104,391 A | * | 8/2000 | Johnston et al. | 345/745 |
| 6,111,573 A | * | 8/2000 | McComb et al. | 345/661 |
| 6,262,726 B1 | * | 7/2001 | Stedman et al. | 345/745 |
| 6,392,671 B1 | * | 5/2002 | Glaser | 715/765 |

OTHER PUBLICATIONS

Heywood, Drew. "Windows NT User Profiles" Sep. 1997. Windows & .NET Magazine. Penton Media. pp 1-2.*

* cited by examiner

*Primary Examiner*—Dennis Bonshock
(74) *Attorney, Agent, or Firm*—Blakely, Sokoloff, Taylor & Zafman LLP

(57) ABSTRACT

Methods and systems for controlling the screen display appearance for a digital processing system. In one exemplary embodiment, a data value, typically stored in a non-volatile memory, is retrieved; this data value represents an appearance of an enclosure of a digital processing system. An appearance of a display of this digital processing system is then set based upon the appearance of the enclosure. In one example, the appearance is the color of the enclosure which determines various colors and backgrounds of objects in a graphical user interface of the digital processing system. Other methods, apparatuses and computer readable media for causing methods to be performed are also described.

49 Claims, 11 Drawing Sheets

"Tangerine"

Enclosures:

Desktop Picture:

User Interface Elements:

"Blueberry"

Enclosures:

511   512

Desktop Picture: 513

User Interface Elements:

514   515   516

"Graphite"

Enclosures:

521  522

Desktop Picture:

523

User Interface Elements:

524  525  526

"Strawberry"

Enclosures:

— 531

Desktop Picture:

— 533

User Interface Elements:

"Lime"

Enclosures:

541

Desktop Picture:

543

User Interface Elements:

544, 545, 546

"Grape"

Enclosures:

551

Desktop Picture:

553

User Interface Elements:

554
555
556

SYSTEM AND METHOD FOR CONTROLLING THE SCREEN DISPLAY APPEARANCE FOR A DATA PROCESSING SYSTEM

FIELD OF THE INVENTION

The present invention relates to the field of data processing systems, such as digital processing systems, and more particularly to digital processing systems which include display devices and which allow for the control of the appearance of objects displayed on the display device.

BACKGROUND OF THE INVENTION

Digital processing systems, such as computer systems, often include the capability to allow the appearance of objects, such as windows and window controls, to be controlled by a user of the system. For example, the user of a conventional computer system can set the color of the background or desktop on which windows appear and the user can set the appearance and color of other objects such as icons, tinting of scroll bars and other window controls, and the appearance of text on or in the windows according to the user's preferences. This allows the user to create a custom environment and may make it more pleasurable to use the system.

Many computer systems include preselected "themes" for setting the appearance of desktop objects such as windows and window controls and other objects displayed on the display device of the digital processing system. A "theme" is a preselected combination of several different appearance attributes which are grouped together into one "theme" or style so that a user may select a particular theme and cause all of the various components or objects to be controlled by the theme or style such that these objects have their colors or appearances controlled by the selected "theme." A theme may include various different appearance attributes such as colors for various different screen objects. For example, a theme may include the colors in menus or menu bars, the tinting or colors of window controls such as scrolling controls and scroll bars, the font of text and the style of the text, a desktop picture or desktop background pattern, the sounds the system makes in response to user action or other sounds, the highlighting color of text when it is selected, and numerous other attributes for various objects which may be displayed on the display device of the digital processing system.

Computer manufacturers have in the past designed certain computers to have certain display appearances. This is accomplished by preparing a particular version of software for the particular machine and storing the software onto a storage device (e.g. a hard disk) of the system so that the system can use this software to generate a desired preselected display appearance. Thus, in each case for each different machine, a computer manufacturer must generate the necessary software for each different machine and load the necessary software on the appropriate machine. If the wrong software is loaded onto the machine, the desired display appearance will not appear on the machine's display device as there is no intelligence built into the machine to provide the software with the necessary information concerning the machine's appearance.

SUMMARY OF THE INVENTION

Methods and apparatuses for controlling the screen display appearance for a data processing system are described here.

In one aspect of the invention, an exemplary method is performed by a digital processing system and this method includes determining or retrieving a data value representing an appearance of an enclosure of the digital processing system, and determining an appearance of a display of the digital processing system based upon the appearance of the enclosure. In one particular embodiment of the invention, this data value is stored in a non-volatile memory.

In another aspect of the invention, an exemplary method for manufacturing a digital processing system includes determining an appearance of an enclosure of the digital processing system and storing in a non-volatile memory of the digital processing system a data value representing the appearance of the enclosure, wherein the data value is retrieved when the digital processing system is first used in order to set an appearance of a display of the digital processing system.

Other aspects of the present invention include computer readable media which store executable program instructions which cause these methods and other methods to be performed. Further, apparatuses according to the present invention are also described herein.

Other features of the present invention will be apparent from the accompanying drawings and from the detailed description which follows.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The present invention is illustrated by way of example and not limitation in the figures of the accompanying drawings in which like references indicate similar elements.

DETAILED DESCRIPTION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Figure 1:
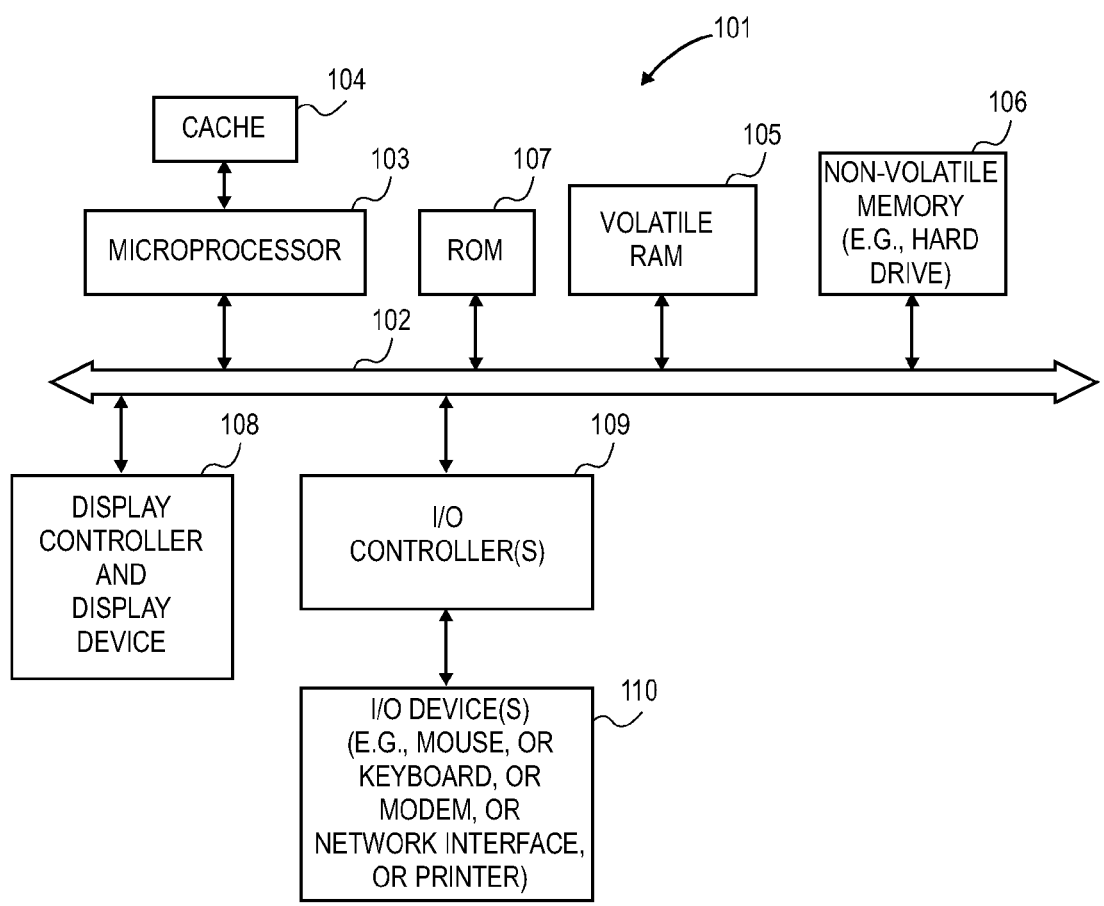
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. For example, certain components may not be present as in the case of network computers or cellular telephones or other types of digital processing systems which have fewer components. Also, it will be appreciated that more components may be used in systems with the present invention. The computer system of FIG. 1 may, for example, be an Apple Macintosh computer.

As shown in FIG. 1, the computer system 101, which is a form of a digital processing system, includes a bus 102 which is coupled to the microprocessor 103 and a read-only memory (ROM) 107 and a volatile RAM 105 and a non-volatile memory 106 which may be a hard drive. It will be appreciated that typically the ROM 107 is also a non-volatile memory. The microprocessor 103, which may be a G3 or G4 microprocessor from Motorola, Inc. or IBM is coupled to cache memory 104 as shown in the example of FIG. 1. The bus 102 interconnects these various components together and also interconnects these components 103, 107, 105, and 106 to display controller and display device 108 and to peripheral devices such as input/output (I/O) devices which may be mice, keyboards, modems, network interfaces, scanners, printers, cameras, and other devices as are well-known in the art. Typically the input/output devices 110 are coupled to the system through input/output controllers 109. The volatile RAM 105 is typically implemented as dynamic random access memory (DRAM) which requires power continually in order to refresh or maintain the data in the memory. The non-volatile memory 106 is typically a magnetic hard drive or a magnetic optical drive or an optical drive or a DVD RAM or other types of memory systems which maintain data even after power is removed from the system. Typically, this non-volatile memory will also be random access memory, although this is not required. FIG. 1 also shows that the non-volatile memory is a local device coupled directly to the rest of the components in the data processing system, but it will be appreciated that the present invention may utilize a non-volatile memory which is remote from the system, such as a network storage device which is coupled to the data processing system through a network interface such as a modem or Ethernet interface. Similarly, the ROM 107 may be remotely located relative to the system and the data from the ROM may be provided through a network interface. The bus 102 may include one or more busses connected to each other through various bridges, controllers and/or adapters as is well-known in the art. In one embodiment, the I/O controller 109 includes a USB (Universal Serial Bus) adapter for controlling USB peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104, or a remote storage device or a combination of one or more of these. In various embodiments, hardware circuitry may be used in combination with software instructions to implement the present invention. It will be appreciated that the invention may be implemented entirely in hardware. Thus the techniques are not limited to any specific combination of hardware circuitry and software nor to any particular source for the instructions (and associated data) which are executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

Figure 2:
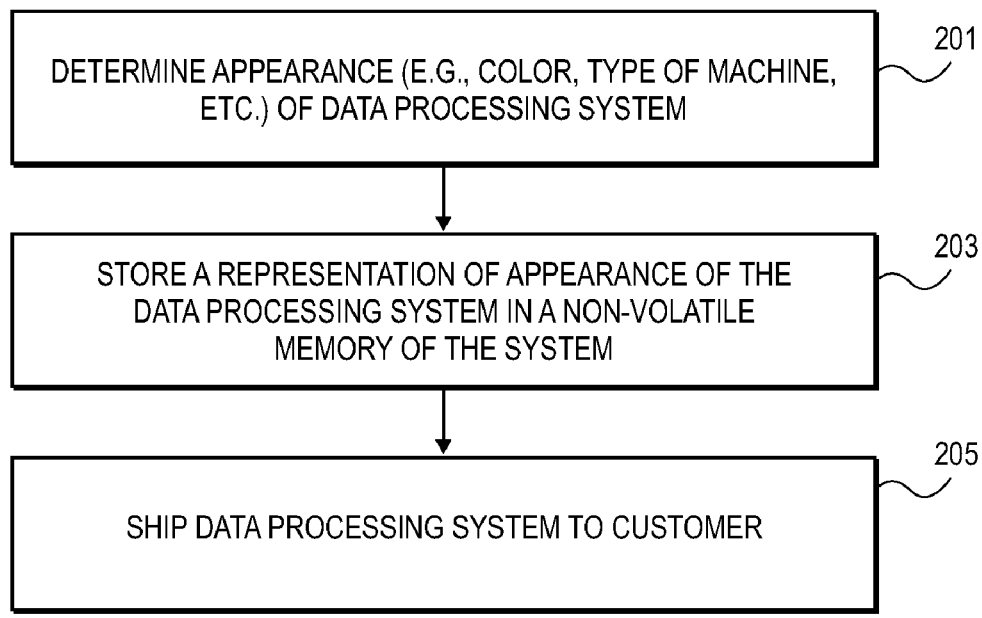
FIG. 2 shows an example of a method of manufacturing a digital processing system according to the present invention.
Figure 5A:
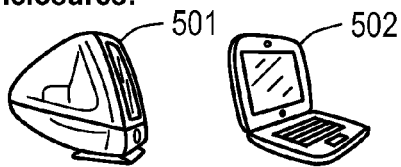
FIGS. 5A, 5B, 5C, 5D, 5E, and 5F show various examples of different desktop themes which may be set and displayed according to various embodiments of the present invention.
Figure 5A:
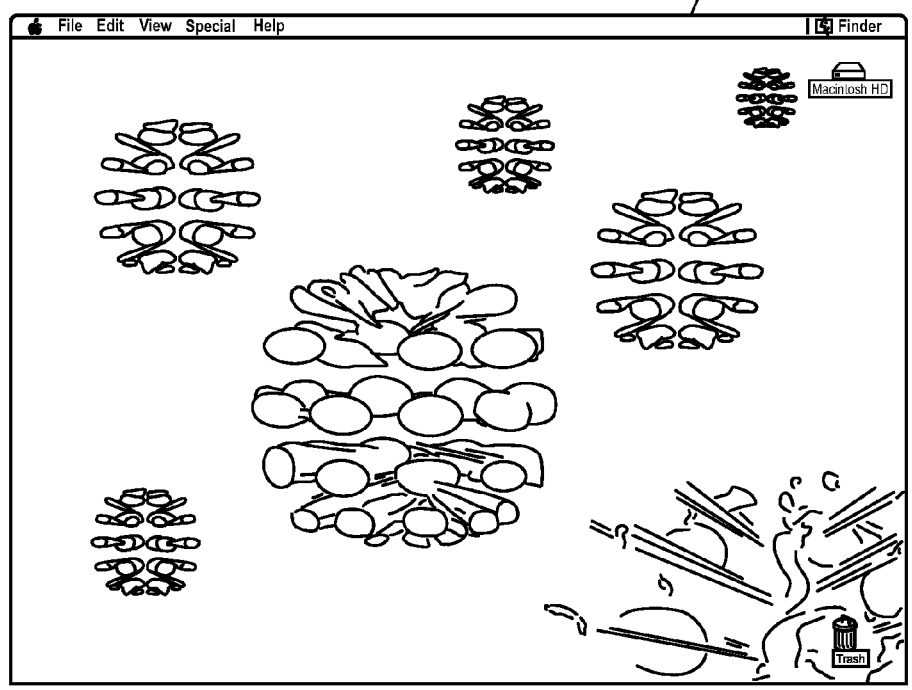
Figure 5A:
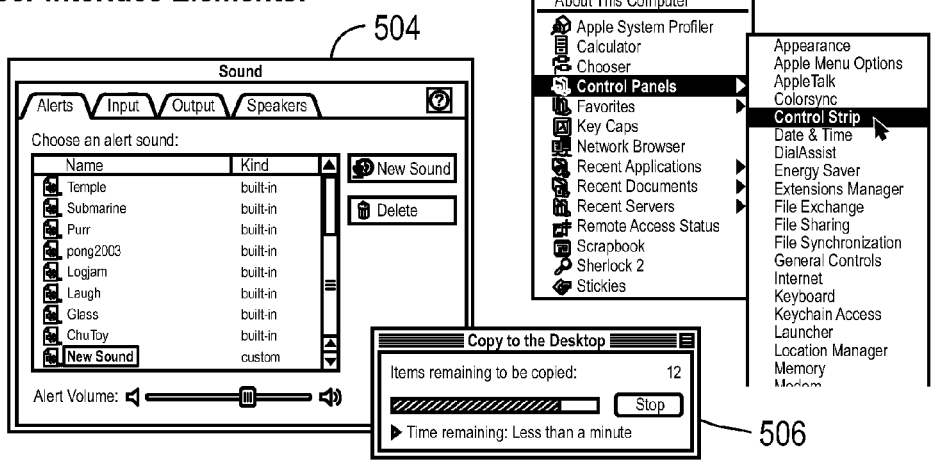
Figure 5B:
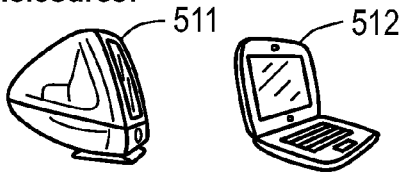
Figure 5B:
Figure 5B:
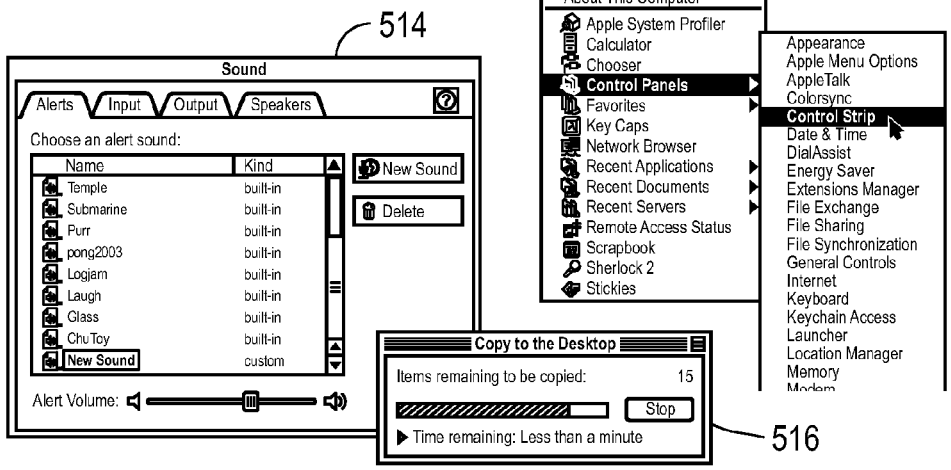
Figure 5C:
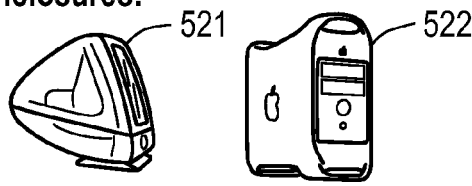
Figure 5C:
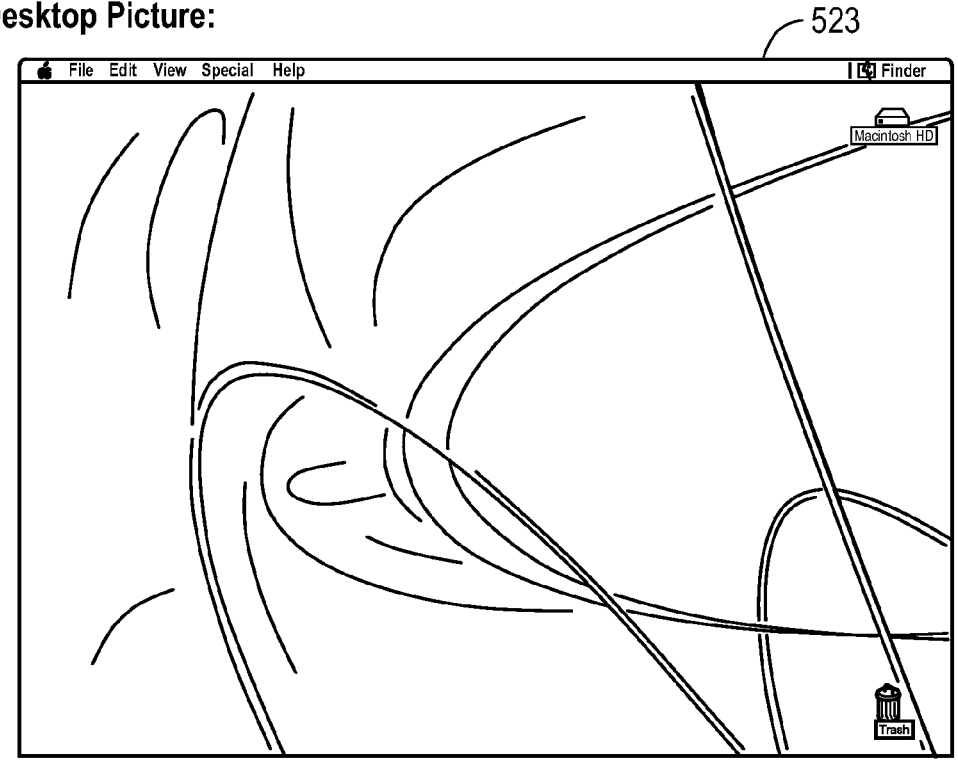
Figure 5C:
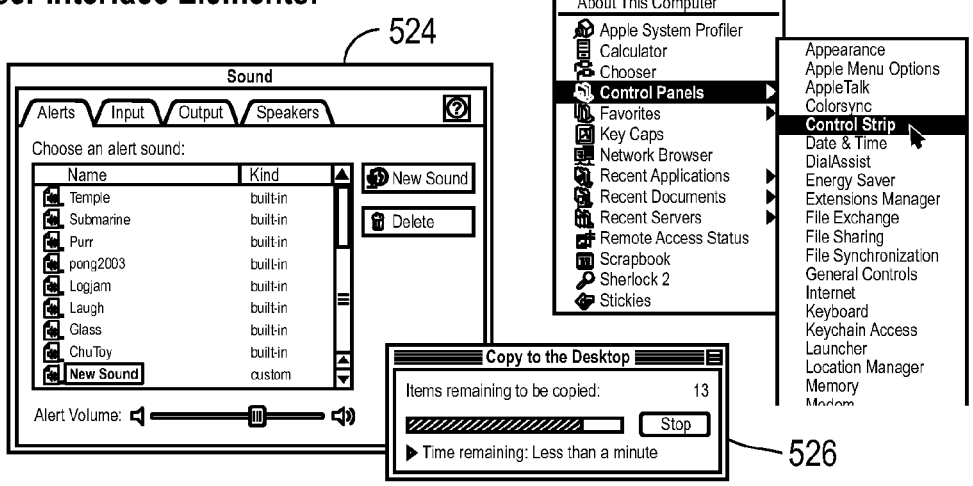
Figure 5D:
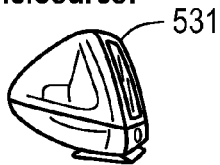
Figure 5D:
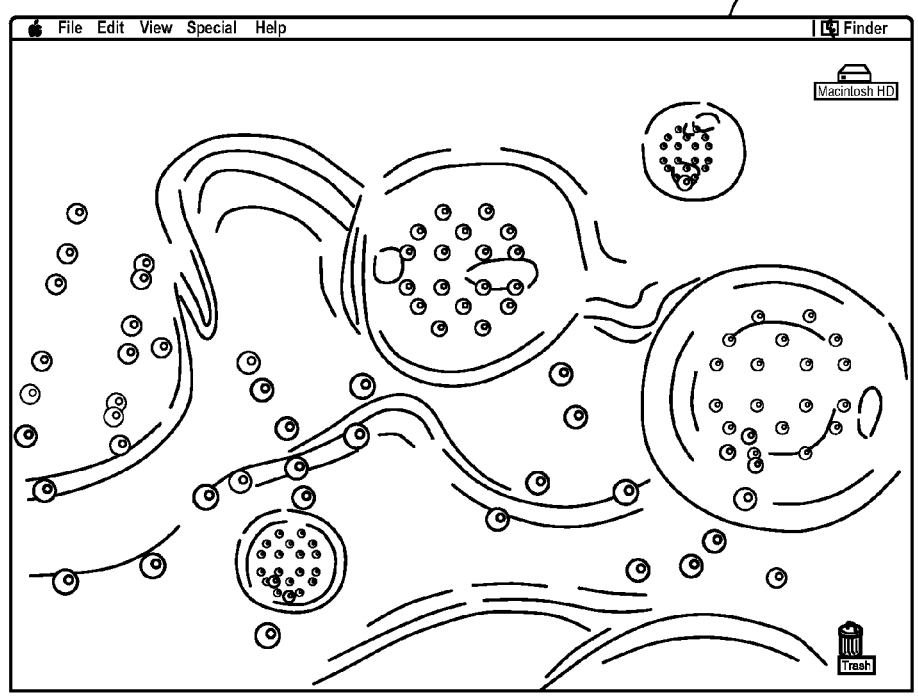
Figure 5D:
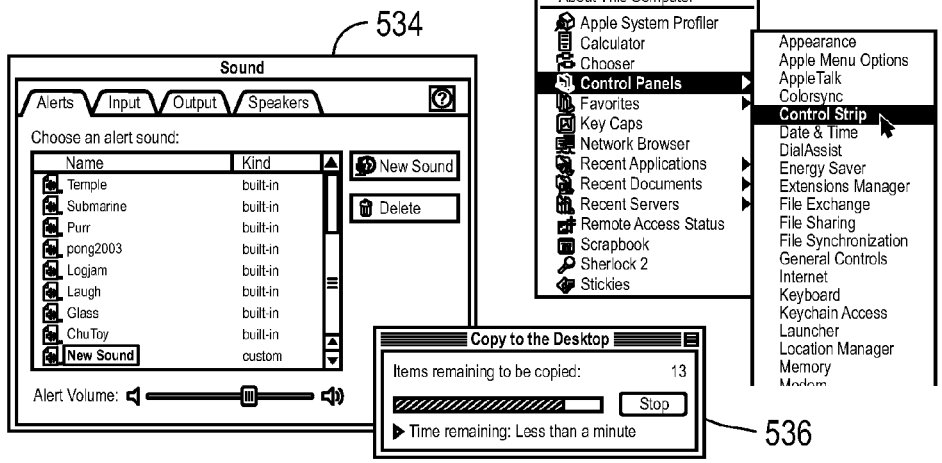

FIG. 2 shows one exemplary method according to the present invention for manufacturing a digital processing system. In the process of manufacturing such a system, the appearance of the system is determined in operation 201. This would typically involve determining the color and type of machine. For example, the color would be the color of the enclosure of the machine and the type of machine would be a laptop or desktop system. For example, a tangerine iMac 501 shown in FIG. 5A has a tangerine-colored enclosure for the digital processing system and the type of machine is an iMac. Similarly, a blueberry iBook 512 shown in FIG. 5B is a digital processing system which has a blueberry enclosure, and the type of machine is a laptop computer.

Figure 3:
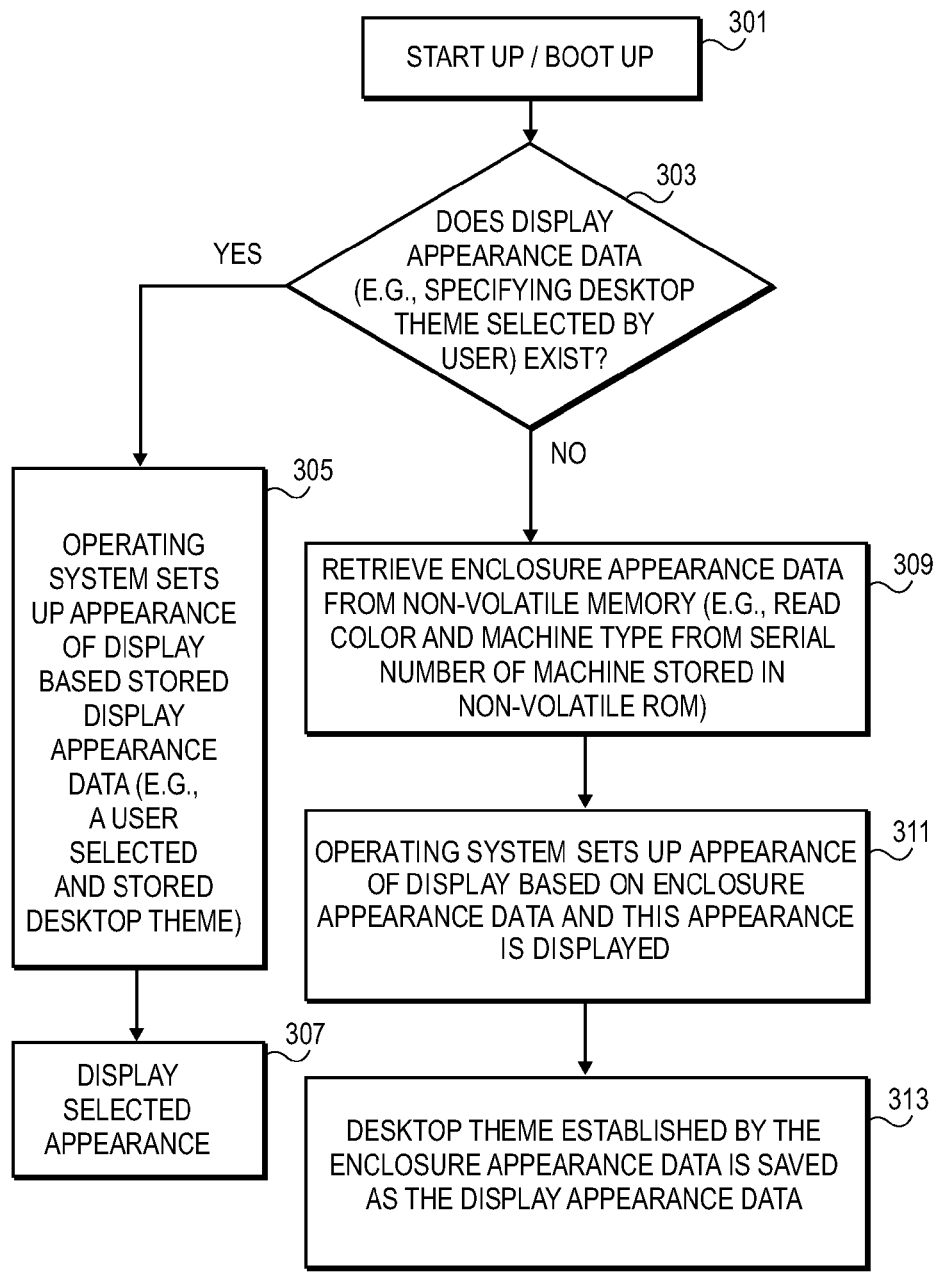
FIG. 3 shows an example of a method of controlling the display of a digital processing system according to one embodiment of the present invention.

In operation 203, the manufacturer of the system stores a representation of the appearance of the data processing system (such as the appearance of the enclosure of the system and the type of system) in a non-volatile memory of the system. Then in operation 205, the manufacturer ships the data processing system to a customer or a distributor who distributes it to a customer. Upon receipt by the customer, the system will usually be started or booted up, which is part of the process of turning on the system. FIG. 3 shows an example of a method of the present invention which may be employed upon the very first start up or boot up of the system and also performed on subsequent start ups or boot ups of the system.

FIG. 3 shows one exemplary embodiment for controlling the appearance of a display device according to one embodiment of the present invention. The method begins in operation 301 which is typically a start up or boot up of the computer system. This will typically involve the user applying power and turning on a switch to cause the computer system to begin operation. At some point in the boot up process, the computer system performs operation 303 in which it determines whether display appearance data, such as a desktop theme which has been selected by a user, has been previously stored. This data typically exists as a preference appearance file or data. If this is the initial time that the computer system is being booted up, then this data does not normally exist and processing proceeds from operation 303 to operation 309. If, on the other hand, this display appearance data does exist (e.g. this is the second time that the computer system has been turned on and display appearance data created during the first time the computer started up has been previously stored and can now be used) then this previously stored display appearance data is used. Thus, if it is determined in operation 303 that a display appearance data does exist, then processing proceeds to operation 305 in which the operating system sets up the appearance of the display device based upon the stored display appearance data, such as a user selected and stored desktop theme. Then in operation 307, the display appearance which has been selected is displayed on a display device. FIGS. 5A through 5F show various possible alternative desktop themes which the operating system may produce.

If in operation 303, it is determined that display appearance data does not exist, then processing proceeds to operation 309 in which enclosure appearance data is retrieved from a non-volatile memory. In one example, the color and machine type is retrieved from the serial number of the machine which is stored in the non-volatile RAM 107. In one exemplary embodiment, the serial number of the machine includes a designation of the color of the machine and the type of machine, and this data is retrieved from the non-volatile memory. This data specifies the enclosure's appearance and is used in operation 311 by the operating system to set up the appearance of the display based upon the enclosure data. The resulting appearance is displayed. FIGS. 5A through 5F show six different exemplary desktop themes which result from the six different enclosures shown in these six figures. In operation 313, the operating system saves the desktop theme which has been established by the enclosure appearance data. The desktop theme is saved as the display appearance data so that in the next boot up or startup process, operation 303 will detect the existence of display appearance data and processing will proceed from operation 303 to 305.

Figure 4:
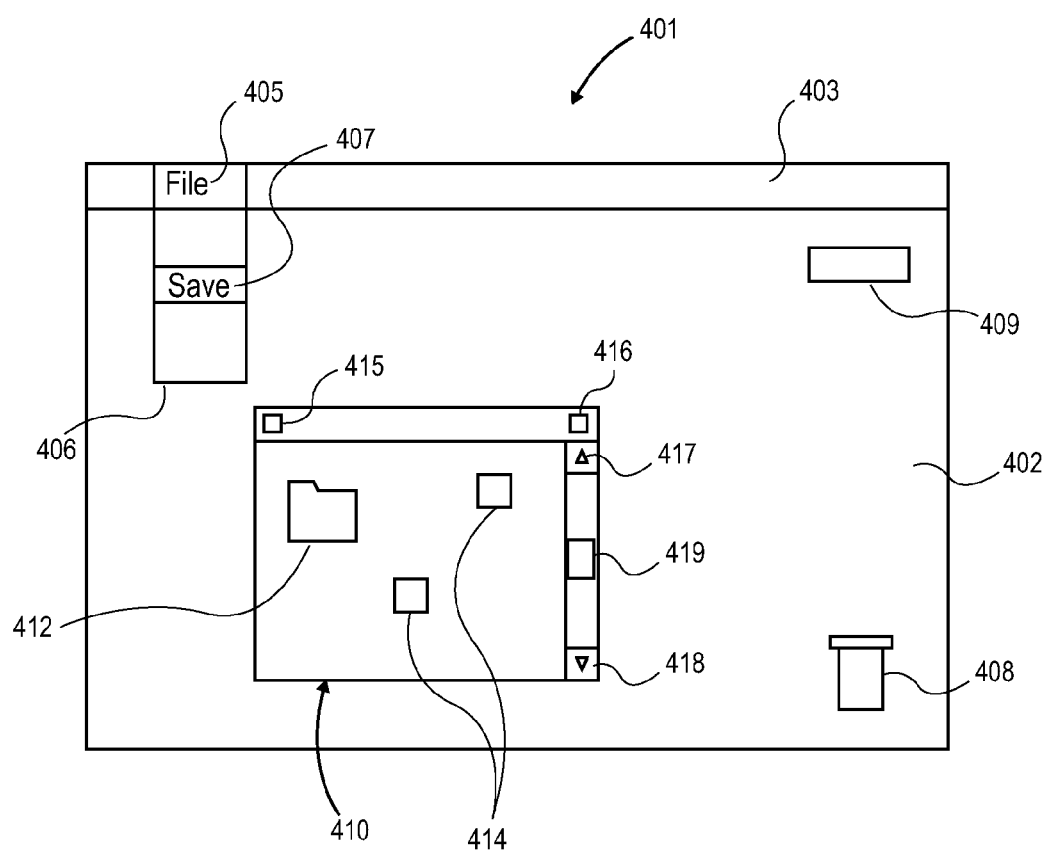
FIG. 4 shows an example of a screen display on a display device of a digital processing system.

FIG. 4 shows an example of a graphical user interface displayed by a display device of the present invention. Further, this figure shows various components of the displayed interface. In particular, the desktop 401 includes a menu bar 403 from which a pull-down menu 406 may be activated by clicking on menu item 405 to display various menu options, such as menu option 407. The process of clicking on a displayed object is well known in the art and includes positioning a cursor over the object and depressing a button or otherwise causing the selection of the object. Icons 409 and 408 are displayed on a desktop 402, and window 410 is shown on top of the desktop 402. The window 410 includes icons 412 and 414 within borders of the window. The window 410 also includes several window controls, such as window controls 415 and 416 for manipulating or controlling the window, and scrolling controls 417, 418 and 419. Each of these various objects may have its appearance, such as the color or style or other display attributes controlled based upon the desktop theme or other display appearance preferences as set by the user or by the manufacturer of the system. For example, the pattern or picture or color on the desktop 402 may be set by the manufacturer or by the user. Similarly, the colors and style of the scroll controls 417, 418, and 419 may be set by the manufacturer or the user. The colors in menus, the font of text in menus, the style of text, the highlight color of selected text or selected objects, the sounds produced by the system, and other display attributes of objects on the display screen may also be set by the user or by the manufacturer as described in the present invention. FIGS. 5A through 5F show six different examples of desktop themes which may be set by a manufacturer and established as the appearance which is displayed upon initial startup by a user of the system. Thus, each of the desktop themes shown in FIGS. 5A through 5F may be established, as in operation 313, by the enclosure appearance data which is retrieved and is used to create display appearance data which may be used in subsequent boot up or start up operations by the user. It will be appreciated that the user may, after this initial boot up, modify the appearance of the display and thereby change the display appearance data which is stored for subsequent boot up operations.

FIGS. 5A through 5F show different examples of colors used in menus, different colored scroll bars, different desktop background pictures, and other different appearance attributes based upon these six different desktop themes.

Figure 5E:
Figure 5E:
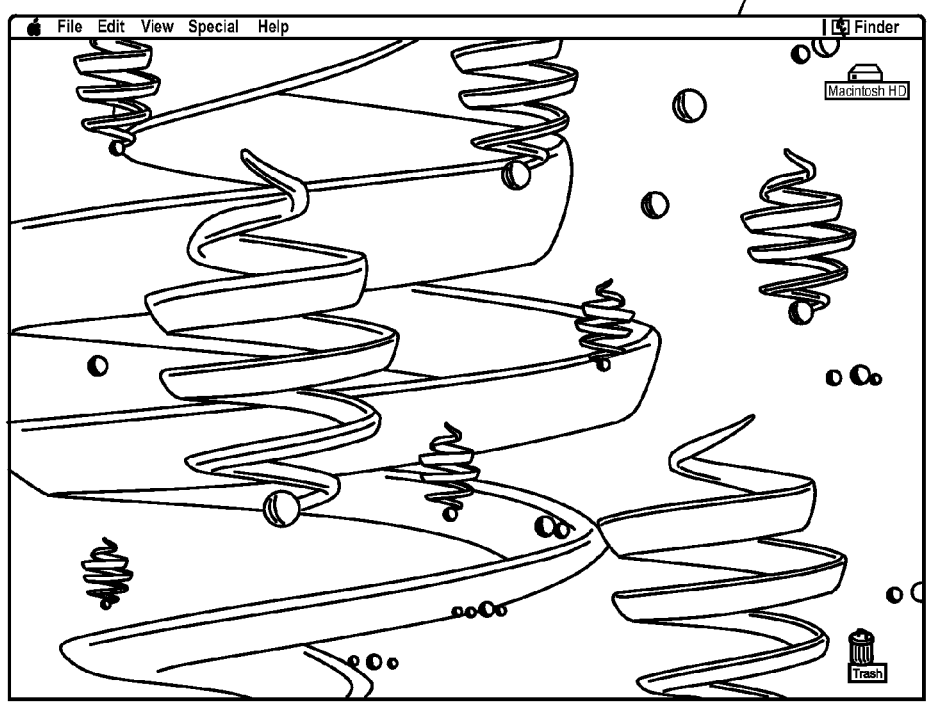
Figure 5E:
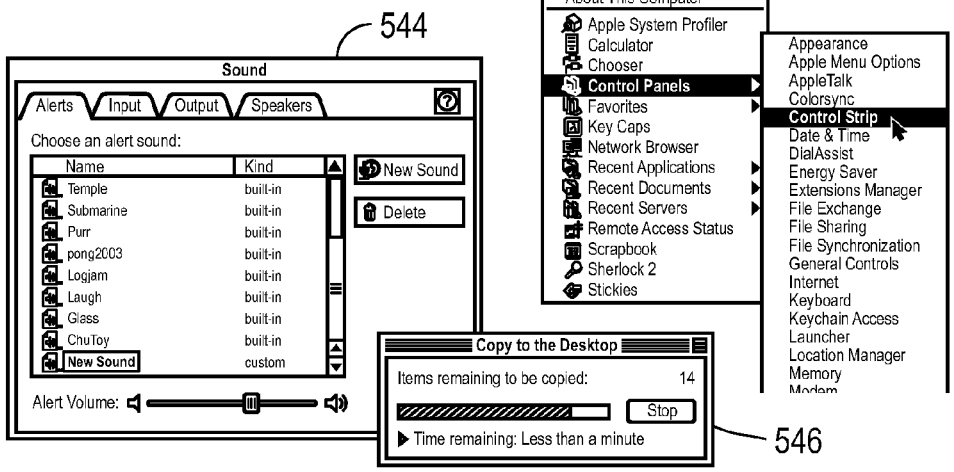
Figure 5F:
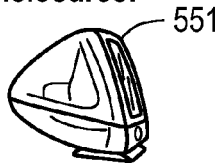
Figure 5F:
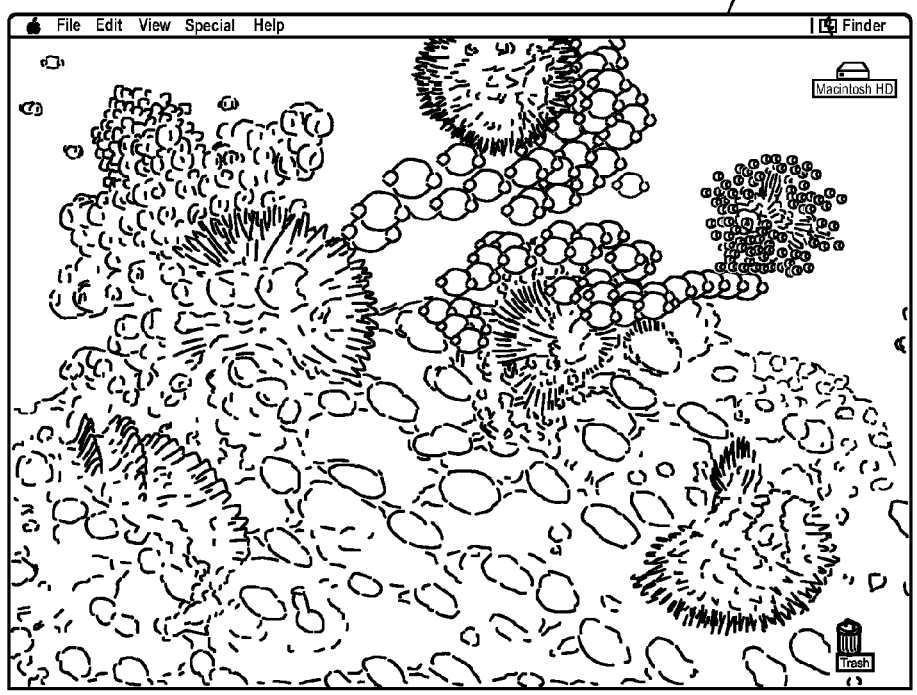
Figure 5F:
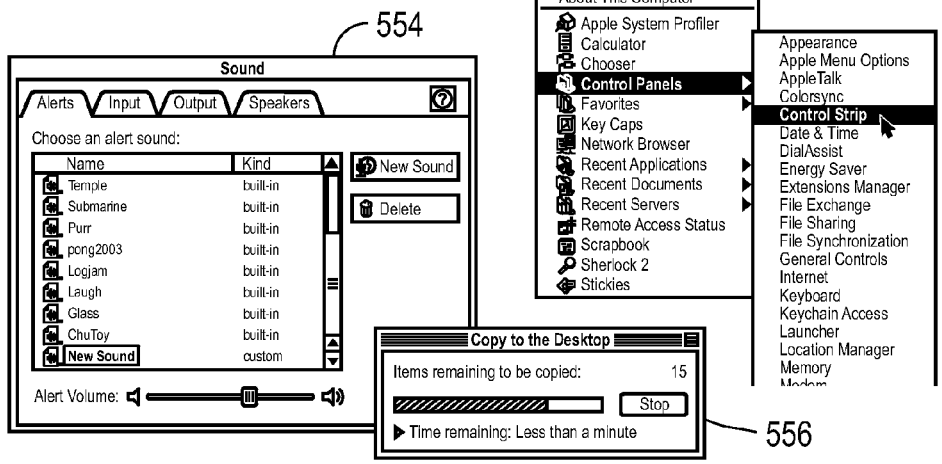

The different desktop themes shown in FIGS. 5A through 5F depend upon the particular enclosures. For example, the enclosures of the iMac 501 and the iBook 502 determine the tangerine desktop theme by having appropriate enclosure appearance data stored in non-volatile memory of these two data processing systems. In turn, this produces the desktop 503 as well as the user interface elements 504, 505, and 506. It will be appreciated that for these two different enclosures that there may be differences between the desktop themes based upon the fact that one enclosure is a desktop computer and another enclosure is a laptop. Similarly, the blueberry theme shown in FIG. 5B is displayed as a result of reading enclosure appearance data saved within the iMac 511 or the iBook 512 as shown in FIG. 5B. This produces the resulting desktop picture 513 and the user interface elements 514, 515, and 516. Enclosures 521 and 522 of FIG. 5C use a graphite desktop theme. Enclosure appearance data stored within non-volatile memory for these two data processing systems specify this graphite desktop theme resulting in the desktop 523 and the user interface elements 524, 525 and 526. The iMac 531 shown in FIG. 5D produces a strawberry desktop theme by using enclosure appearance data stored in the non-volatile memory of the iMac 531 to create this strawberry desktop theme which includes the desktop picture 533 as well as the user interface elements 534, 535 and 536. Similarly, the iMac 541 uses a lime desktop theme to produce the desktop 543 and the user interface elements 544, 545, and 546 as shown in FIG. 5E. The grape desktop theme shown in FIG. 5F is shown by the grape iMac 551 which results in the desktop 553 and the user interface elements 554, 555, and 556.

Figure 6:
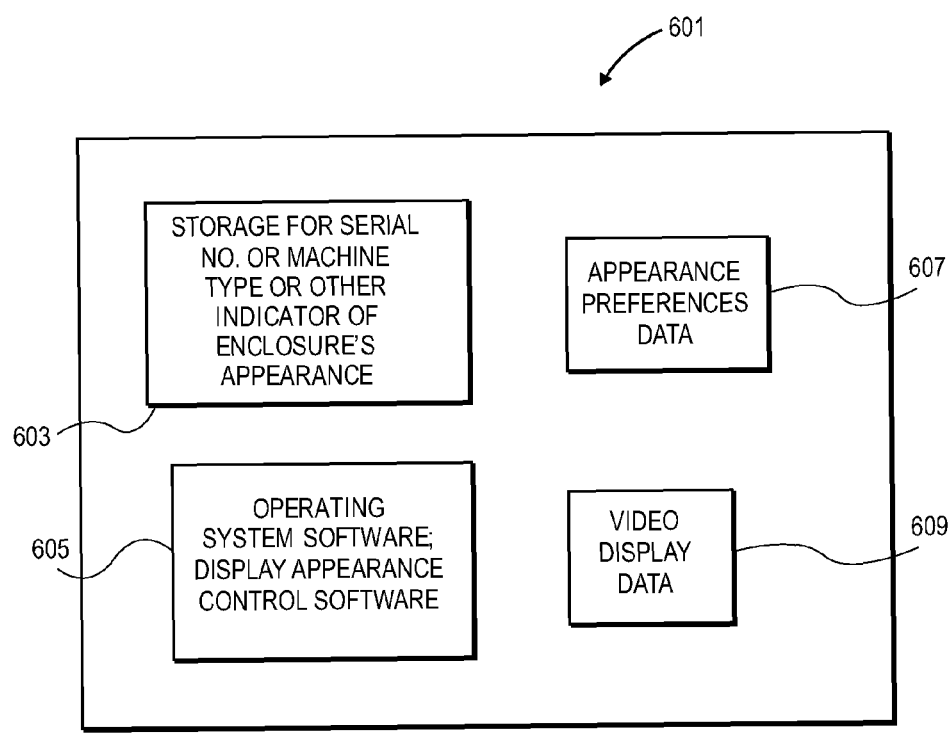
FIG. 6 shows an example of a computer readable media which may be used to store software and data which when executed by a data processing system causes the system to perform various methods of the present invention.

FIG. 6 shows an example of a computer readable media which may be used to store executable computer program instructions which when executed on a digital processing system cause the digital processing system to perform various methods according to the present invention. This media may also store data, such as the appearance preferences data 607 and may be considered to include video display data 609 which may be a frame buffer or other data for driving a display device, such as a cathode ray tube or a liquid crystal display device. This media 601 also includes storage 603 which is for storing a serial number or a machine type or other indicator of the enclosure's appearance. This storage may be in ROM or may be on a remote storage device which is accessed by the system through a network. Typically, the ROM will be a local device such as the ROM 107 which is coupled to the bus 102 as shown in FIG. 1. Storage is also provided in the media 601 for operating system software and for display appearance control software 605. This software controls the appearance of the display according to the methods of the present invention, such as, for example, the method shown in FIG. 3 to produce the various desktop themes depending on the data value stored in storage 603 which indicates the enclosure's appearance. As noted above, this executable software and data may be stored in various places including, for example, ROM 107, the volatile RAM 105, the non-volatile memory 106 and/or the cache 104. Portions of this software and/or data may be stored in any one of these storage devices. The media 601, for example, may be primarily the volatile RAM 105 and the non-volatile memory 106 and the ROM 107 in one embodiment. It will be appreciated that the storage for the operating system software and the display appearance control software 605 may be remotely located relative to the data processing system. For example, this storage 605 may be on a server computer which provides the software via a network interface to the digital processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer readable media storing executable computer program instructions which when executed on a digital processing system cause said digital processing system to perform a method comprising:
retrieving a data value representing an appearance of an enclosure enclosing said digital processing system including a microprocessor, wherein said data value includes a value representing at least one of a machine type and a color of said enclosure of said digital processing system; and
determining an appearance of a display of said digital processing system based upon said appearance of said enclosure.

2. A computer readable medium as in claim 1 wherein said data value is stored in a memory which is coupled to said digital processing system.

3. A computer readable medium as in claim 2 further comprising:
determining whether a user defined set of display preferences has been stored in said digital processing system before said determining of said appearance of said display.

4. A computer readable medium as in claim 3 wherein said determining whether said user defined set has been stored is performed before said retrieving.

5. A computer readable medium as in claim 4 wherein if a user defined set of display preferences has not been stored in said digital processing system, then said retrieving is performed and said data value is used to store said user defined set.

6. A computer readable medium as in claim 5,
wherein if said user defined set has been stored, said appearance of said display is determined based on said user defined set.

7. A computer readable medium as in claim 2 wherein said determining said appearance comprises setting an appearance of at least one of (a) a desktop background; (b) a desktop background picture; (c) colors of objects in menus; (d) colors of window controls; (e) font of text in menus; and (f) sounds produced by said digital processing system.

8. A computer readable medium as in claim 1, wherein said data value is stored in a memory which is coupled to sad digital processing system, and
wherein said memory is a non-volatile memory and wherein said data value is stored in said memory by a manufacturer of said digital processing system.

9. A digital processing system comprising:
a processor;
a display coupled to said processor;
a bus coupled to said processor;
a memory coupled to said bus, said memory storing a data value representing an appearance of an enclosure enclosing said digital processing system including a microprocessor, said processor retrieving said data value and setting an appearance of said display based upon said appearance of said enclosure, wherein said data value includes a value representing at least one of a machine type and a color of said enclosure of said digital processing system.

10. A digital processing system as in claim 9 wherein said data value is retained by said digital processing system even when power is not supplied to said digital processing system.

11. A digital processing system as in claim 10 wherein said processor determines whether a user defined set of display preferences has been stored before setting said appearance of said display.

12. A digital processing system as in claim 11 wherein if said user defined set has been stored, said processor sets said appearance of said display based upon said user defined set.

13. A digital processing system as in claim 10 wherein said setting of said appearance of said display comprises setting an appearance of at least one of (a) a desktop background; (b) a desktop background picture; (c) colors of objects in menus; (d) colors of window controls; (e) font of text in menus; and (f) sounds produced by said digital processing system.

14. A method of manufacturing a digital processing system, said method comprising:
determining an appearance of an enclosure enclosing a digital processing system including a microprocessor; and
storing in a non-volatile memory of said digital processing system a data value representing said appearance of said enclosure, wherein said data value is retrieved when said digital processing system is first used in order to set an appearance of a display of said digital processing system, wherein said data value includes a value representing at least one of a machine type and a color of said enclosure.

15. A method as in claim 14 wherein said appearance of said display includes at least one of (a) a desktop background; (b) a desktop background picture; (c) colors of objects in menus; (d) colors of window controls; (e) font of text in menus; and (f) sounds produced by said digital processing system.

16. A method for operating a digital processing system, said method comprising:
retrieving a data value representing an appearance of an enclosure enclosing said digital processing system including a microprocessor, wherein said data value includes a value representing at least one of a machine type and a color of said enclosure of said digital processing system; and
determining an appearance of a display of said digital processing system based upon said appearance of said enclosure.

17. A method as in claim 16 wherein said data value is stored in a memory which is coupled to said digital processing system.

18. A method as in claim 17, wherein said memory is a non-volatile memory and wherein said data value is stored in said memory by a manufacturer of said digital processing system.

19. A method as in claim 17 further comprising:
determining whether a user defined set of display preferences has been stored in said digital processing system before said determining of said appearance of said display.

20. A method as in claim 19 wherein said determining whether said user defined set has been stored is performed before said retrieving.

21. A method as in claim 20 wherein if a user defined set of display preferences has not been stored in said digital processing system, then said retrieving is performed and said data value is used to store said user defined set.

22. A method as in claim 17 wherein said determining said appearance comprises setting an appearance of at least one of (a) a desktop background; (b) a desktop background picture; (c) colors of objects in menus; (d) colors of window controls; (e) font of text in menus; and (f) sounds produced by said digital processing system.

23. A computer readable medium storing executable computer program instructions which when executed on a digital processing system cause the digital processing system to perform a method comprising:

retrieving a data value representing an appearance of an enclosure enclosing the digital processing system including a microprocessor;

determining an appearance of at least one object displayed on a display of the digital processing system based the data value.

24. A computer readable medium as in claim 23 wherein the data value is stored in a memory which is coupled to the digital processing system.

25. A computer readable medium as in claim 24 wherein the memory is a non-volatile memory and wherein the data value is stored in the memory by a manufacturer of the digital processing system.

26. A computer readable medium as in claim 24 further comprising:

determining whether a user defined set of display preferences has been stored in the digital processing system before the determining of the appearance of the display.

27. A computer readable medium as in claim 26 wherein the determining whether the user defined set has been stored is performed before the retrieving.

28. A computer readable medium as in claim 27 wherein if a user defined set of display preferences has not been stored in the digital processing system, then the retrieving is performed and the data value is used to store the user defined set.

29. A computer readable medium as in claim 28 wherein if the user defined set has been stored, the appearance of the display is determined based on the user defined set.

30. A computer readable medium as in claim 24 wherein the data value includes a value representing at least one of a machine type and a color of the enclosure of the digital processing system.

31. A computer readable medium as in claim 24 wherein the determining the appearance comprises setting an appearance of at least one of (a) a desktop background; (b) a desktop background picture; (c) colors of objects in menus; (d) colors of window controls; (e) font of text in menus; and (f) sounds produced by the digital processing system.

32. A digital processing system comprising:

a processor;

a display coupled to the processor;

a bus coupled to the processor;

a memory coupled to the bus, the memory storing a data value representing an appearance of an enclosure enclosing the digital processing system including the processor, the processor retrieving the data value and setting an appearance of at least one object displayed on the display based upon the data value.

33. A digital processing system as in claim 32 wherein the data value is retained by the digital processing system even when power is not supplied to the digital processing system.

34. A digital processing system as in claim 33 wherein the processor determines whether a user defined set of display preferences has been stored before setting the appearance of the display.

35. A digital processing system as in claim 34 wherein if the user defined set has been stored, the processor sets the appearance of the display based upon the user defined set.

36. A digital processing system as in claim 34 wherein the data value includes a value representing at least one of a machine type and a color of the enclosure of the digital processing system.

37. A digital processing system as in claim 33 wherein the setting of the appearance of the display comprises setting an appearance of at least one of (a) a desktop background; (b) a desktop background picture; (c) colors of objects in menus; (d) colors of window controls; (e) font of text in menus; and (f) sounds produced by the digital processing system.

38. A method of manufacturing a digital processing system, the method comprising:

determining an appearance of an enclosure enclosing a digital processing system including a microprocessor;

storing in a non-volatile memory of the digital processing system a data value representing the appearance of the enclosure, wherein the data value is retrieved when the digital processing system is first used in order to set an appearance of at least one object displayed on a display of the digital processing system.

39. A method as in claim 38 wherein the data value includes a value representing at least one of a machine type and a color of the enclosure.

40. A method as in claim 38 wherein the appearance of the display includes at least one of (a) a desktop background; (b) a desktop background picture; (c) colors of objects in menus; (d) colors of window controls; (e) font of text in menus; and (f) sounds produced by the digital processing system.

41. A method for operating a digital processing system, the method comprising:

retrieving a data value representing an appearance of an enclosure enclosing the digital processing system including a microprocessor;

determining an appearance of at least one object displayed on a display of the digital processing system based upon the data value.

42. A method as in claim 41 wherein the data value is stored in a memory which is coupled to the digital processing system.

43. A method as in claim 42 wherein the memory is a non-volatile memory and wherein the data value is stored in the memory by a manufacturer of the digital processing system.

44. A method as in claim 42 further comprising:

determining whether a user defined set of display preferences has been stored in the digital processing system before the determining of the appearance of the display.

45. A method as in claim 44 wherein the determining whether the user defined set has been stored is performed before the retrieving.

46. A method as in claim 45 wherein if a user defined set of display preferences has not been stored in the digital processing system, then the retrieving is performed and the data value is used to store the user defined set.

47. A method as in claim 42 wherein the data value includes a value representing at least one of a machine type and a color of the enclosure of the digital processing system.

48. A method as in claim 42 wherein the determining the appearance comprises setting an appearance of at least one of (a) a desktop background; (b) a desktop background picture; (c) colors of objects in menus; (d) colors of window controls; (e) font of text in menus; and (f) sounds produced by the digital processing system.

49. A machine readable medium providing executable program instructions to cause a data processing system to perform a method for operating the digital processing system, the method comprising:

determining whether a user defined set of display preferences has been stored in the digital processing system;

if a user defined set of display preferences has not been stored in the digital processing system, retrieving a data value representing an appearance of an enclosure enclosing the digital processing system including a microprocessor, wherein the data value is stored in a memory coupled to the digital processing system; and determining an appearance of a display of the digital processing system based upon the appearance of the enclosure, wherein if the user defined set has been stored, the appearance of the display is determined based on the user defined set.

* * * * *

UNITED STATES PATENT AND TRADEMARK OFFICE
CERTIFICATE OF CORRECTION

| | | |
|---|---|---|
| PATENT NO. | : 7,761,798 B1 | |
| APPLICATION NO. | : 09/551303 | |
| DATED | : July 20, 2010 | |
| INVENTOR(S) | : Nick King et al. | |

It is certified that error appears in the above-identified patent and that said Letters Patent is hereby corrected as shown below:

In column 7, line 2, in claim 1, delete "media" and insert -- medium --, therefor.

In column 7, line 43, in claim 8, delete "sad" and insert -- said --, therefor.

In column 9, line 7, in claim 23, delete "based the" and insert -- based upon the --, therefor.

Signed and Sealed this
Eighth Day of November, 2011

David J. Kappos
*Director of the United States Patent and Trademark Office*